(12) United States Patent
Coslovi

(10) Patent No.: US 7,422,229 B2
(45) Date of Patent: Sep. 9, 2008

(54) HAND AND PLATFORM TROLLEY

(76) Inventor: Claudio Coslovi, 25 Marshall Road, Kirrawee (AU) NSW 2232

( * ) Notice: Subject to any disclaimer, the term of this patent is extended or adjusted under 35 U.S.C. 154(b) by 0 days.

(21) Appl. No.: 10/479,400

(22) PCT Filed: May 28, 2002

(86) PCT No.: PCT/AU02/00675

§ 371 (c)(1), (2), (4) Date: Aug. 12, 2004

(87) PCT Pub. No.: WO02/096739

PCT Pub. Date: Dec. 5, 2002

(65) Prior Publication Data

US 2005/0006860 A1    Jan. 13, 2005

(30) Foreign Application Priority Data

Jun. 1, 2001    (AU) ................... PR5376
Jul. 3, 2001    (AU) ................... PR6079

(51) Int. Cl.
*B62B 3/02*    (2006.01)
(52) U.S. Cl. .................... 280/641; 280/47.2
(58) Field of Classification Search .............. 280/30, 280/47.17, 47.19, 47.27, 47.21, 47.24, 47.2, 280/47.29, 639, 38, 40, 641, 651, 654; 16/35 R
See application file for complete search history.

(56) References Cited

U.S. PATENT DOCUMENTS

| | | | | |
|---|---|---|---|---|
| 3,498,628 A * | 3/1970 | Ferneau et al. | ............. | 280/641 |
| 4,009,762 A * | 3/1977 | Bjerkgard | ............. | 182/20 |
| 4,047,724 A * | 9/1977 | Shaffer | ............. | 280/5.22 |
| 4,155,527 A * | 5/1979 | Sjoberg | ............. | 248/647 |
| 4,337,960 A * | 7/1982 | Stewart | ............. | 280/47.371 |
| 5,170,529 A * | 12/1992 | Kovacs | ............. | 16/35 R |
| 5,172,451 A * | 12/1992 | Chiu | ............. | 16/35 R |
| 5,450,650 A * | 9/1995 | Bertrand et al. | ............. | 16/35 R |
| 5,669,100 A * | 9/1997 | Carpenter | ............. | 16/35 R |
| 5,713,584 A * | 2/1998 | Crane | ............. | 280/47.35 |
| 5,745,951 A * | 5/1998 | Waner | ............. | 16/31 R |
| 5,810,373 A * | 9/1998 | Miranda | ............. | 280/47.2 |
| 5,810,543 A * | 9/1998 | Hall | ............. | 414/490 |
| 5,983,614 A * | 11/1999 | Hancock et al. | ............. | 56/16.7 |

(Continued)

FOREIGN PATENT DOCUMENTS

FR    2513957    *    4/1983

*Primary Examiner*—Frank B Vanaman
(74) *Attorney, Agent, or Firm*—Townsend and Townsend and Crew, LLP

(57) ABSTRACT

Embodiments of the invention provide a trolley apparatus having a hand trolley use configuration and a platform trolley use configuration. The apparatus comprises a body and first and second sets of ground engaging wheels. The body is adapted to be loaded with goods when in either configuration. The first set of wheels have a common axis, are adapted to be attached to the body and are movable between two positions: a first position adjacent one end of the body when in the hand trolley configuration, and a second position adjacent the other end of the body when in the platform trolley configuration. The first set of wheels are adapted to engage the ground when in either of the configurations. The second set of wheels have a common axis, are attached to one end of the body and are adapted to engage the ground when in the platform trolley configuration.

2 Claims, 5 Drawing Sheets

U.S. PATENT DOCUMENTS

| | | | |
|---|---|---|---|
| 6,036,219 A * | 3/2000 | Oefelein et al. | 280/638 |
| 6,050,576 A * | 4/2000 | Tanner et al. | 280/47.21 |
| 6,168,174 B1 * | 1/2001 | MacDougall | 280/47.34 |
| 6,199,508 B1 * | 3/2001 | Miale et al. | 119/28.5 |
| 6,273,438 B1 * | 8/2001 | Prapavat | 280/47.21 |
| 6,364,328 B1 * | 4/2002 | Stahler, Sr. | 280/47.18 |
| 6,488,304 B2 * | 12/2002 | Krawczyk | 280/408 |
| 6,588,775 B2 * | 7/2003 | Malone, Jr. | 280/47.18 |

* cited by examiner

HAND AND PLATFORM TROLLEY

This invention relates to trolleys for carrying goods and the like and, in particular, to a trolley which has two configurations such that it can be used as both a hand trolley and a platform trolley.

BACKGROUND OF THE INVENTION

Trolleys used to carry goods and the like include so-called hand trolleys and platform trolleys, as well as other types.

A hand trolley is one which usually has a pair of wheels attached to a pair of parallel handles or the like which are able to be gripped. In some examples, the handles are joined at their extremities with a cross member and so-called pistol grips can also be attached to the handles for ease of use. The hand trolley is generally used to transport relatively light loads of goods, whereby the trolley is pivoted about the axis of the wheels and pushed or pulled.

A platform trolley is one which has a chassis or frame placed on wheels such that when the chassis or frame is loaded with goods, the platform trolley can be pushed or pulled appropriately. Such trolleys generally have three or more wheels and as well as being used to transport goods and the like can be used as mobile storage devices or mobile work platforms.

It is believed that it would be advantageous to have a hand trolley which could be easily converted into a platform trolley such that the one trolley having different configurations can have multiple uses.

OBJECT OF THE INVENTION

It is an object of the present invention to provide a trolley apparatus with different configurations of use which provide advantages over known trolley devices. At the very least, the invention provides an alternative to presently known trolley devices.

DISCLOSURE OF THE INVENTION

According to the present invention, there is provided a trolley apparatus having a hand trolley use configuration and a platform trolley use configuration, said apparatus having a body adapted to be loaded with goods or the like when in either said platform trolley configuration where the body is substantially horizontal or in said hand trolley use configuration on where the body is substantially non-horizontal, a first set of ground engaging wheels having a common axis, said first set of wheels being adapted to be attached to the body movable between two positions, a first position adjacent one end of the body when in the hand trolley use configuration and a second position adjacent the other end of the body when in the platform trolley use configuration, said first set of wheels being adapted to engage the ground when in either the band trolley use configuration or the platform trolley use configuration, and a second set of ground engaging wheels having a common axis, said second set of wheels being attached to said one end of said body and being adapted to engage the ground when in the platform trolley use configuration.

Preferably, the first set of wheels are attached to the body by pivotal arm means. The first set of wheels are preferably a pair of wheels attached to a pair of pivotal arms, whereby the pivotal arms are parallel and coupled together, the pivotal arms being pivotal about pivotal connections positioned substantially between the first and second positions of the first set of wheels. Preferably, the axis of the first pair of wheels is spaced downwardly from the body when the wheels are in both the hand trolley use configuration and the platform trolley use configuration.

Preferably, the first pair of wheels have a fixed axis and are not able to be steered.

Preferably, the second set of wheels do not engage the ground when in the hand trolley use configuration. Preferably, the second set of wheels are smaller in diameter than the first set of wheels and are attached to the body by brackets extending downwardly from said body when in the platform trolley use configuration.

Preferably, the second set of wheels are a pair of castor type wheels.

Preferably, the body is a frame having parallel arms with cross braces therebetween in the preferred form, the cross braces are adapted such that the trolley can be used in both use configurations. Preferably, a flange is provided at the one end to assist in the carrying of goods when in the hand trolley use configuration. Preferably the flange extends perpendicularly from the frame, and in a preferred form is pivotal about the edge of the frame to be moved to a position where it is abutting against the frame in a parallel manner.

Preferably, there is one of the cross braces located at the other end of the frame, this cross brace acting as a handle means. In the preferred form the two parallel arms and the cross brace acting as the handle means are formed from one piece of material in a U-shape.

Preferably, a pair of pistol grip handles are provided adjacent the other end of the flame, the pistol grip handles extending downwardly from the frame. In the preferred form, the pistol grip handles provide spacers between the frame and the axis of the first pair of wheels, the ends of the spacers abutting against the pair of pivotal arms when in the platform use trolley use configuration.

Preferably, the first pair of wheels are latched into the first position when in the hand trolley use configuration.

BRIEF DESCRIPTION OF THE DRAWINGS

An embodiment of the present invention will now be described with reference to the drawings in which.

BEST MODE OF CARRYING OUT THE INVENTION

Figure 1:
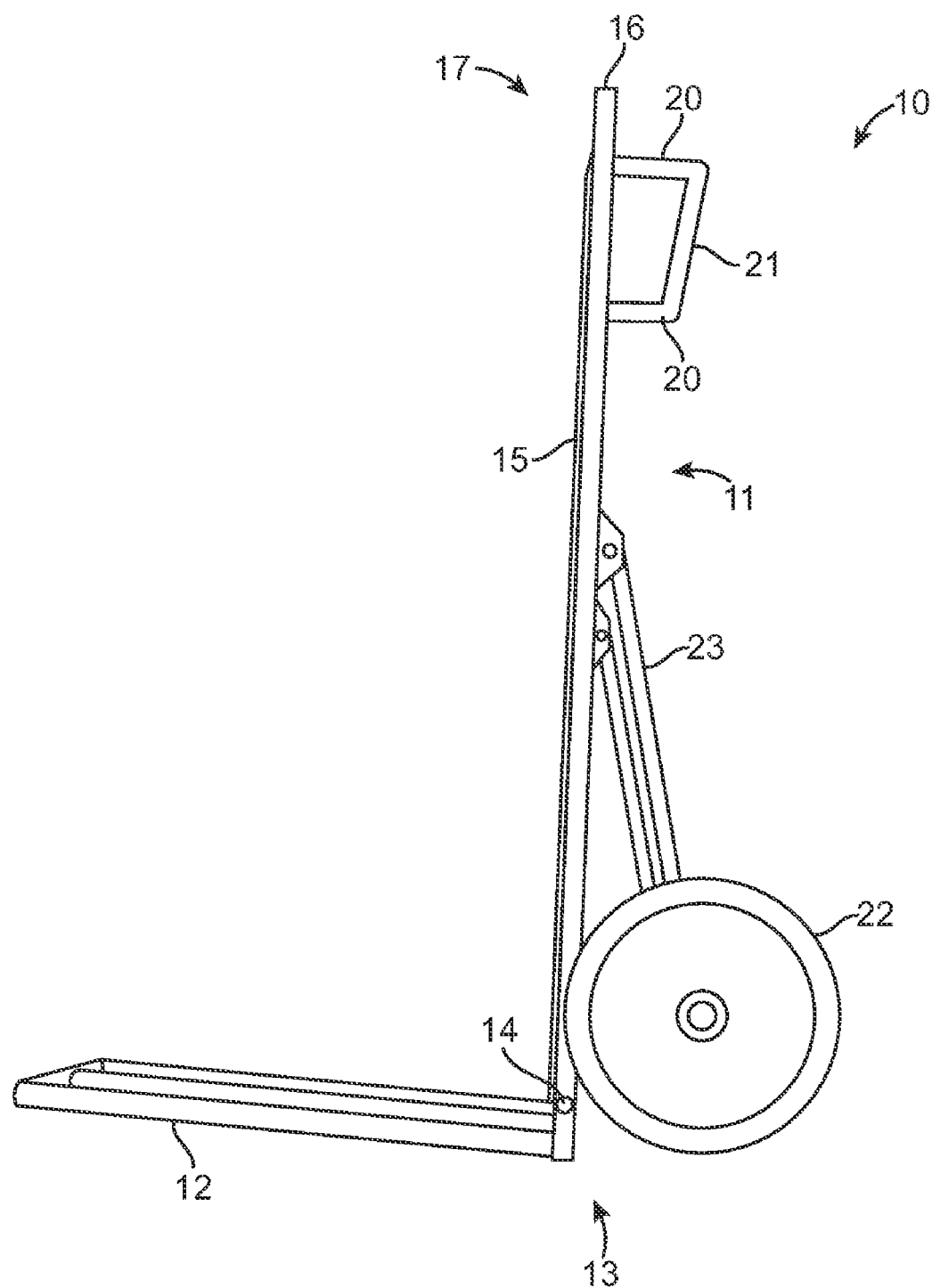
FIG. 1 is a schematic side view of the trolley when in the hand trolley use configuration.
Figure 2:
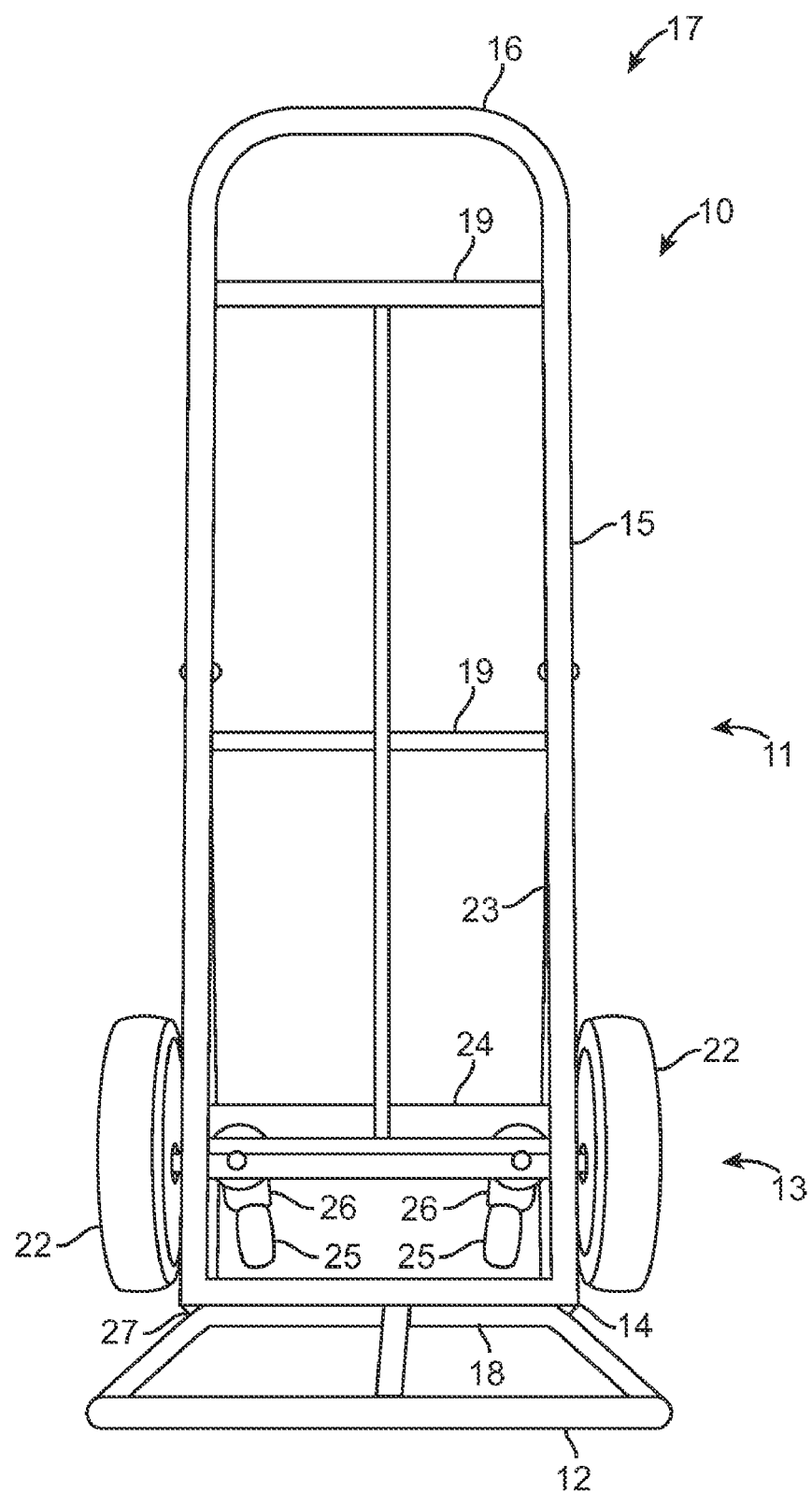
FIG. 2 is a schematic front view of the trolley when in the hand trolley use configuration.
Figure 3:
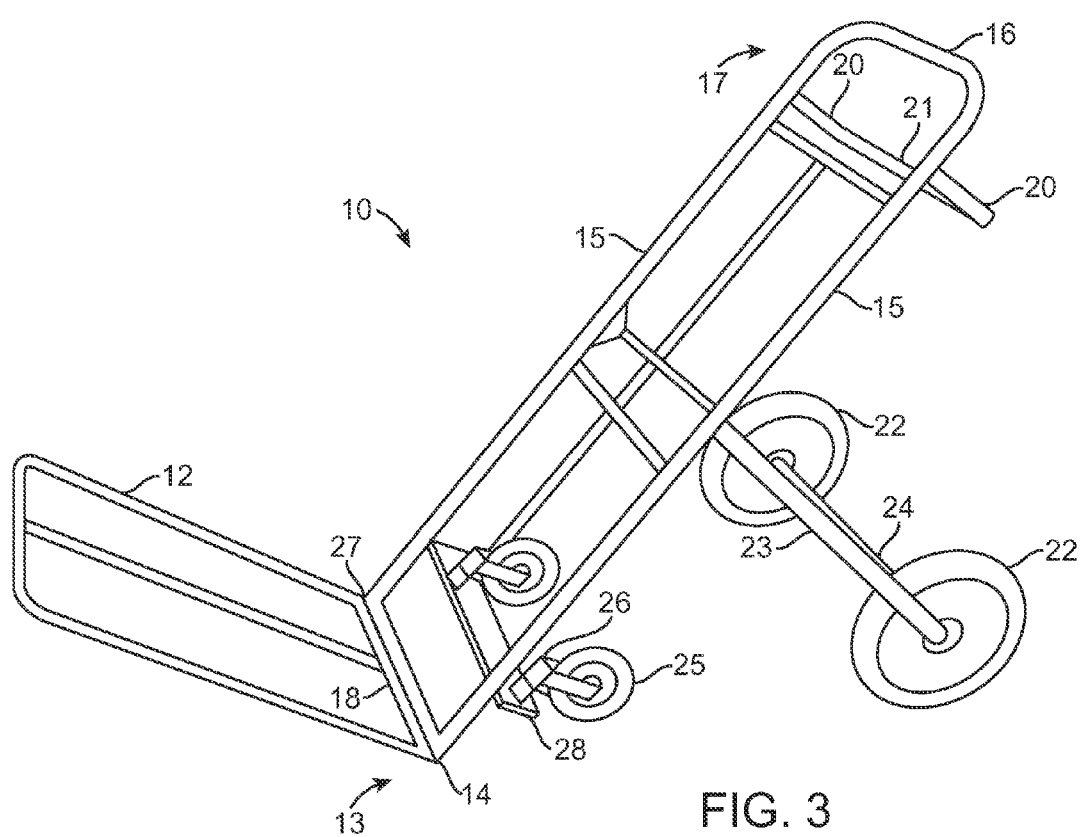
FIG. 3 is a of schematic side perspective view of the trolley as it is converted from the hand trolley use configuration to the platform trolley use configuration.
Figure 4:
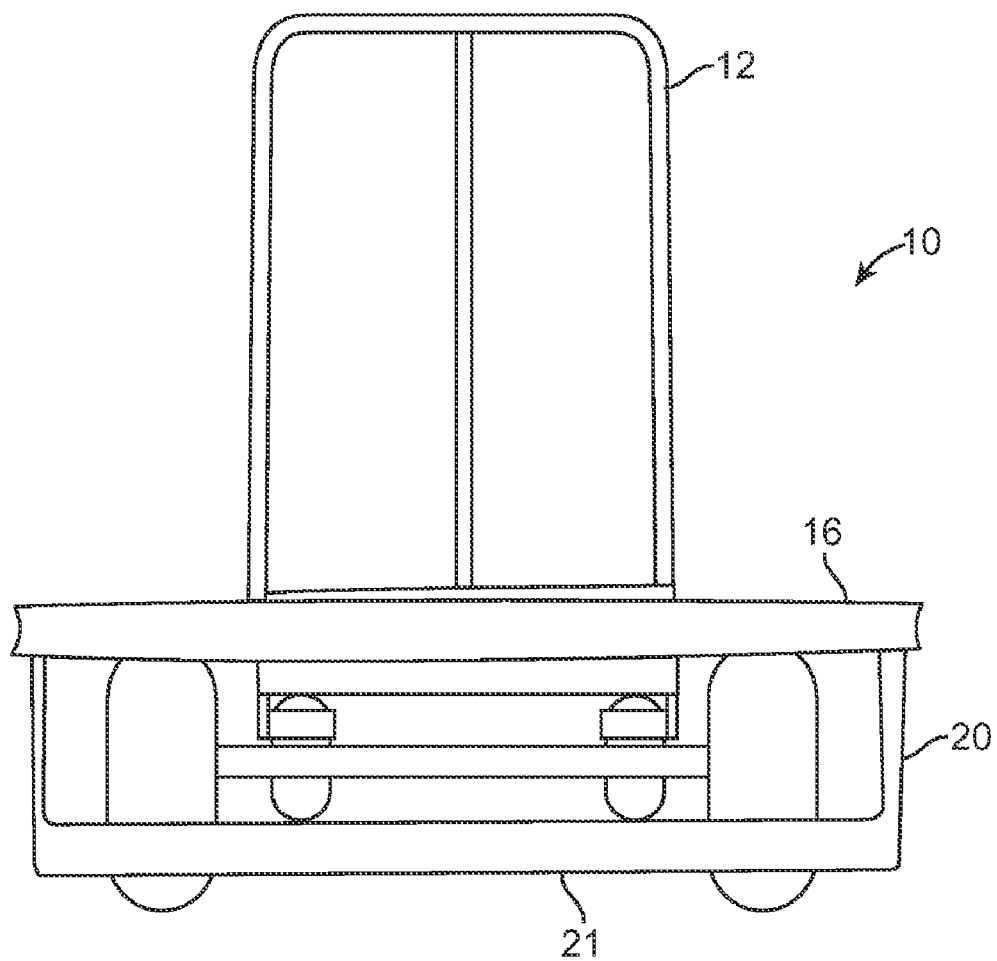
FIG. 4 is a schematic front perspective view of the trolley in the platform trolley use configuration.
Figure 5:
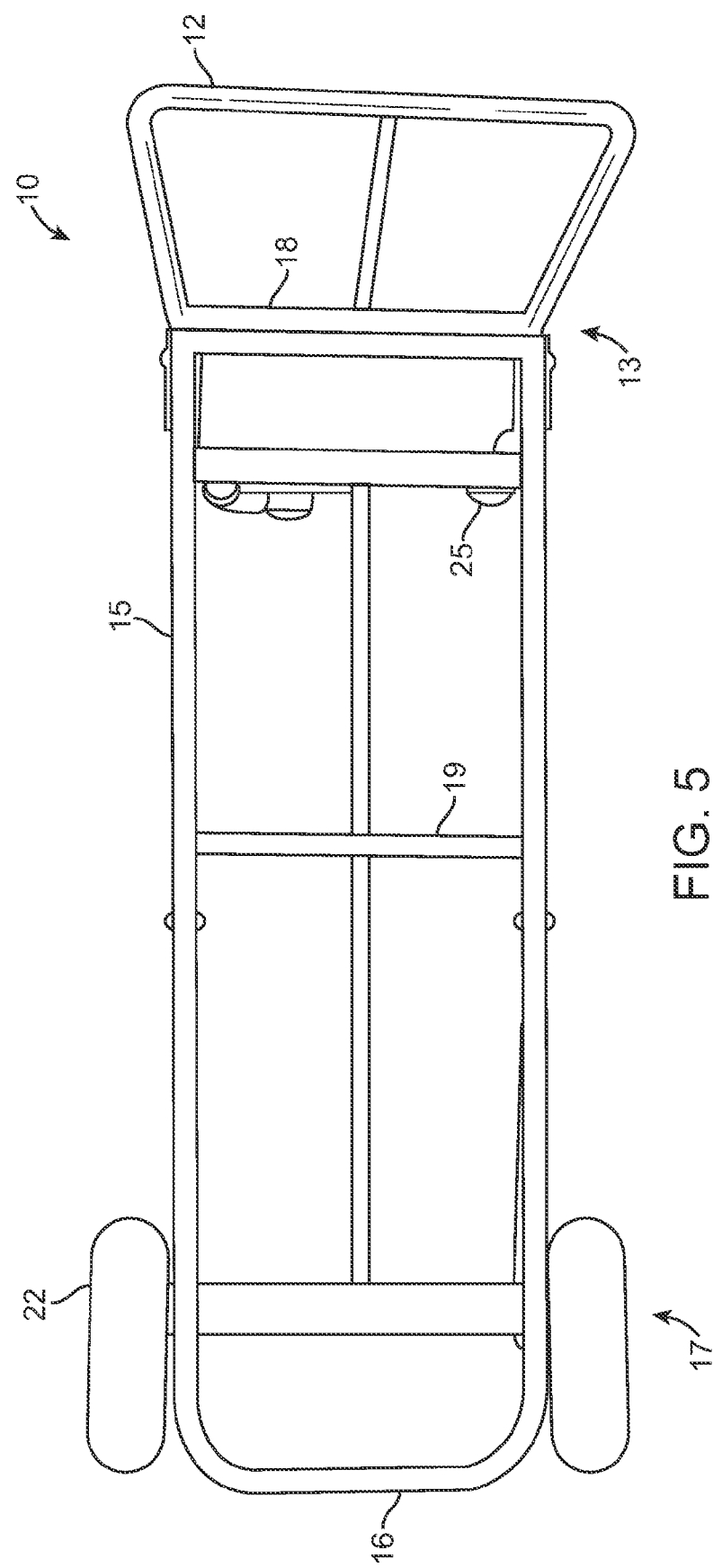
FIG. 5 is a schematic plan perspective view of the trolley in the platform trolley configuration.

A preferred embodiment of the trolley 10 of the present invention having a hand trolley use configuration and a platform trolley use configuration is illustrated in the drawings.

The trolley 10 has a frame 11 with a perpendicular flange 12 extending from the first end 13.

This flange 12 acts as the carrying bracket when the trolley 10 is used in the hand trolley use configuration and can be pivotal about the first end 13 in a preferable form of the invention such that it abuts in a parallel manner to the frame 11. A latch device 14 can be used to secure the flange 12 in this position.

The frame 11 consists of a pair of parallel arms 15 with a handle 16 extending therebetween at a second end 17 of the frame 11. A cross brace 18 is provided at the first end of the frame 11 to attach the flange 12 thereto. Other cross braces 19 assist the strength of the frame 11 and also assist in carrying goods on the trolley 10. A pair of pistol grip handles 20 with a cross brace 21 extend outwardly from the parallel arms 15 and are used for ease of use as well as spacers which will be described later.

A first pair of wheels 22 are pivotally connected to the frame 11 by means of a pair of pivotal arms 23 pivotally connected to the pair of parallel arms 15 substantially at mid points thereof. A cross bracket 24 connects the pivotal arm 23 in parallel such that they always pivot together. These wheels 22 are the main wheels of the trolley 10 and as such are not able to be steered but are fixed in their axis planes.

A second pair of wheels 25 are connected to the frame 11 by brackets 26. These wheels 25 are preferably castor type wheels and are smaller in diameter than the wheels 22. The brackets 26 are connected to the cross brace 18 as they need to be spaced inside the fist pair of wheels 22 when in the hand trolley use configuration.

When the trolley 10 is in the hand trolley use configuration as seen in FIG. 1, the first pair of wheels 22 are preferably latched into a first position by a latch device 27, the wheels 22 being spaced apart from the frame 11 by spacers 28 extending downwardly from the frame 11. The latching into position can be achieved by any suitable means. In this use configuration, the second pair of wheels 25 do not engage the ground and the trolley 10 is pushed or pulled using the first pair of wheels 22.

In order to convert the trolley 10 from the hand trolley use configuration to the platform trolley use configuration, the first pair of wheels 22 are unlatched and moved away from the frame 11 by means of the pivotal arms 23 while the trolley 10 is standing up on the wheels 22. As the wheels 22 are moved away, the second pair of wheels 25 engage the ground and as the pivotal arms 23 pivot further, the frame 11 is forced into a horizontal position whereby the pistol grip handles 20 (which act as spacers) abut against the parallel arms 15. the trolley 10 is now in the platform trolley use configuration with all four wheels 22 and 25 engaging the ground with the frame 11 being substantially horizontal.

To convert back into the hand trolley configuration, the handle 16 is lifted and the pivotal arms 23 once again pivot about the midpoint if the frame 11 until the frame 11 is substantially upright and can be latched into the configuration.

The pivotable nature of the larger ground engaging wheels 22 allows the trolley 10 to be easily manufactured without the need for intricate details. The spacers provided on the trolley allow for the smaller wheels 25 to remain attached to the trolley 10.

The foregoing describes only some embodiments of the present invention, and modifications obvious to those skilled in the at can be made thereto without departing from the scope of the present invention.

The invention claimed is:

1. A trolley apparatus having a hand trolley use configuration and a platform trolley use configuration, said apparatus comprising:

a body adapted to be loaded with goods when in either said platform trolley configuration where the body is substantially horizontal or in said hand trolley use configuration where the body is substantially non-horizontal;

a first set of wheels having a common axis, said first set of wheels being adapted to be attached to the body and movable between two positions, a first position adjacent to one end of the body when the trolley is in the hand trolley use configuration and a second position adjacent the other end of the body when the trolley is in the platform trolley use configuration, the wheels engaging the ground in either position;

at least two pivotal arms coupling the first set of wheels to the body, the at least two pivotal arms being substantially parallel and configured to pivot about a common axis to move the first set of wheels from the first position to the second position;

a second set of castor type wheels having a common axis, said second set of castor type wheels being attached to said one end of said body and being adapted to engage the ground when the trolley is in the platform trolley use configuration; and a pair of handles positioned adjacent the other end of the frame, the handles extending downwardly from the frame and providing spacers between the frame and the axis of the first pair of wheels, the ends of the spacers abutting against the pair of pivotal arms when the trolley is in the platform trolley use configuration.

2. A trolley according to claim 1, wherein the handles are pistol grip handles.

* * * * *